United States Patent [19]

Rademachers et al.

[11] Patent Number: 4,470,844
[45] Date of Patent: Sep. 11, 1984

[54] AGGLOMERATED FERROMAGNETIC IRON PARTICLES

[75] Inventors: Jakob Rademachers; Rolf Naumann; Hans-Peter Biermann; Gunter Buxbaum; Wolfgang Rambold, all of Krefeld, Fed. Rep. of Germany

[73] Assignee: Bayer Aktiengesellschaft, Leverkusen, Fed. Rep. of Germany

[21] Appl. No.: 324,915

[22] Filed: Nov. 25, 1981

[30] Foreign Application Priority Data

Dec. 19, 1980 [DE] Fed. Rep. of Germany ....... 3048086

[51] Int. Cl.$^3$ .............................................. C22C 1/04
[52] U.S. Cl. .......................... 75/0.5 AA; 75/0.5 BA; 148/105
[58] Field of Search ..................... 75/0.5 BA, 0.5 AA; 427/127, 214, 216, 242; 148/105

[56] References Cited

U.S. PATENT DOCUMENTS

| | | | |
|---|---|---|---|
| 1,857,201 | 5/1932 | Lathrop | 427/216 |
| 4,030,913 | 6/1977 | Wegener | 75/0.5 BA |
| 4,197,347 | 4/1980 | Ogawa et al. | 75/0.5 BA |
| 4,222,798 | 9/1980 | Yoda | 75/0.5 AA |
| 4,305,752 | 12/1981 | Dizikes | 75/0.5 BA |
| 4,317,675 | 3/1982 | Nishihara et al. | 75/0.5 BA |
| 4,369,076 | 1/1983 | Miyahara et al. | 148/105 |

OTHER PUBLICATIONS

Chemical Engineer's Handbook, 1973, pp. 20-18 and 20-19.

Primary Examiner—John P. Sheehan
Attorney, Agent, or Firm—Sprung, Horn, Kramer & Woods

[57] ABSTRACT

Spherical agglomerates of surface-stabilized primary particles substantially consisting of iron, having a BET surface of about 5 to 50 m$^2$/g, measured on the agglomerate, in non-pyrophoric form and having a bulk density of about 0.5 to 2.0 kg/l and an agglomerate diameter of about 0.5 to 10 mm are produced by (a) reducing in dry phase particles consisting essentially of iron oxide,
(b) intensively dispersing the particles in liquid phase,
(c) coating the particles with an inorganic and/or organic coating optionally containing corrosion inhibitors,
(d) separating the particles from the liquid phase by evaporating the volatile components with a continuously rotating and simultaneously tumbling movement, and
(e) subjecting the resulting granulates to a thermal treatment. The particles are especially useful for the production of magnetic recording media.

4 Claims, No Drawings

AGGLOMERATED FERROMAGNETIC IRON PARTICLES

This invention relates to spherical agglomerates of primary particles substantially consisting of iron, a process for the production of these agglomerates and the use thereof for the production of magnetic recording media.

The continuously increasing demand for even higher quality materials for magnetic recording has led in recent years to the development of magnetic metal and alloy pigments, predominantly based on iron, cobalt and/or nickel. Compared to conventional iron oxide and chromium dioxide pigments, these are distinguished by considerably greater energy products and they enable magnetogram carriers of superior storage density to be produced while simultaneously reducing the quantity of magnetically active materials required.

These metal pigments are primarily produced by a careful reduction of acicular precursor compounds, such as, for example, the oxides or hydroxides of metals, at relatively low temperatures.

These metal pigments are oxidation-sensitive and pyrophoric due to their fine-particled character. For further processing, e.g. for the production of magnetic tapes, the metal particles have to be stabilized. This is carried out both by a controlled oxidation process as well as by an after-treatment of the metal powders in the liquid phase.

As a result of this, after separating the liquid, a protective coating is produced on the surface of the metallic iron particles which protects the surface from further oxidation. The treatment is carried out both in the aqueous phase as well as in organic solvents or in mixtures of the two.

These materials preferably used as protective coating materials are those which are capable of forming a polymeric layer on the metal surface. The following, for example, have been used: acrylates, alkylene oxides, organic or inorganic silicon compounds.

The treatment in the liquid phase preferably takes place after intensive dispersion in order as far as possible to destroy secondary agglomerates which have formed and to apply the protective covering onto each individual grain. The after-treated iron particles are normally recovered by evaporating the liquid phase.

According to Japanese Published Patent Application No. 54/121206; it is not easily possible to separate the liquid from the metallic iron particles while retaining the desirable magnetic characteristics. Most of the processes known hitherto are, moreover, unsatisfactory, because they either require the addition of solvents, e.g. acetone, to assist in the evaporation of water, or they constitute too great a risk of self-ignition in air. According to other processes, the separation step is carried out in apparatus having moving installed parts which produce a pulverulent material.

If the iron particles are dried in a stationary layer after a preceding filtration step, large agglomerations are obtained which have to be crushed to a uniform grain size of, for example, from 1 to 10 mm. Apart from the fact that, during this operation, a considerable amount of dust is produced, surfaces which are again free and unprotected emerge as a result of crushing, which considerably influences the degree of stabilization.

Another known method comprises spray drying the stabilized suspension. Spherical agglomerates with good flow characteristics are obtained by this process, but they are also very finely-particled and have a diameter of well below 1 mm and still tend to give off dust. Their bulk density has a very low value of from 0.2 to 0.5 kg/l.

However, it is desirable for advantageous handling and further processing to obtain stabilized metal particles in a uniform grain size, and which are free-flowing and non-dust-producing. They should also have a high bulk density and should nevertheless be effectively dispersible for the tape manufacturer.

An object of the present invention is to provide a material which does not have the disadvantages described. This material should contain fine metal particles in a stabilized form and should be non-dust-producing and free-flowing with a high bulk density. Furthermore, this material should be effectively dispersible for working into magnetic tapes.

A material which meets all these requirements in an outstanding manner comprises spherical agglomerates of surface-stabilized primary particles substantially consisting of iron, having a BET surface of from 5 to 50 $m^2/g$, measured on the agglomerate, in non-pyrophoric form, and having a bulk density of from 0.5 to 2.0 kg/l, preferably from 0.8 to 1.5 kg/l, and an agglomerate diameter of from 0.5 to 10 mm, preferably from 1 to 5 mm.

The spherical agglomerates are particularly insensitive to oxidation when the primary particles are rendered passive by a coating consisting of polymers and/or hydrolyzates and/or condensates of inorganic and/or organic compounds in quantities of from 0.2 to 30% by weight, preferably from 1 to 20% by weight and most preferably from 2 to 15% weight based on the total weight. In this embodiment, the coating may also contain one or more corrosion inhibitors which are compounds selected from benzotriazoles, benzothiazoles, benzimidazoles, quanidines, amidines, phosphate, phosphonates and/or metal salts of carboxylic acids, used in a quantity of from 0.01 to 5% by weight, preferably from 0.1 to 4% by weight and in particular from 0.5 to 3% by weight, based on the metal.

The spherical agglomerates according to the invention may be obtained by reducing acicular particles substantially consisting of iron oxides in the dry phase, intensively dispersing the products in a liquid phase, providing them with an inorganic and/or organic coating which may contain corrosion inhibitors, and separating them from the liquid phase by evaporating the volatile components with a constantly rotating and simultaneously tumbling movement.

Evaporation is carried out particularly advantageously at a pressure of from 25 to 150 mbar. Owing to this type of evaporation, the magnetic characteristics of the iron particles are not impaired. Spherical agglomerates with the grain size and apparent density specified are formed during evaporation as a result of the tumbling, rolling movement. Surprisingly, the agglomerates do not become bonded together or bonded to the walls of the drying apparatus. The proportion of unagglomerated material below 1 mm in particle diameter is relatively low at approximately 5% by weight. This fine material may be sieved out and returned to the wet process. The proportion above 10 mm is also of the order of 5% by weight and is also returned.

In addition to the known measures for increasing the grain size of the spherical agglomerates to produce larger particles, e.g. by changing the rate of revolution of the drying apparatus, this may also be effected by charging the drying apparatus in two or more sections. By adding a fresh suspension to agglomerates which have already formed during drying, the grains further increase in size. Moreover, the drying apparatus is better charged to capacity in this method.

Effectively dispersed, homogeneous suspensions having solids contents of from 15 to 30% by weight are preferably used. Dispersion may be carried out in ball mills, stirrer-equipped vessels having high-speed mixing devices or in dispersing machines. By adding compounds of phosphoric acid, such as polyphosphates, or derivatives of phosphonic acids, e.g. salts or esters of 2-phosphonobutane-1,2,4-tricarboxylic acid, pastes which would otherwise be very viscous may be liquefied if an increase in the concentration of the iron portions in the suspension is required. As a result of adding phosphorus compounds, corrosion of the iron particles in the magnetic recording media is simultaneously inhibited.

In order to save energy, the solids may be concentrated in a preliminary stage. The stabilizing material which is added in quantities of from 5 to 15% by weight, based on metallic iron is mainly drawn into the surfaces of the primary particles during treatment. The portion which does not become attached to the particle surface is mainly drawn onto the agglomerate surface during treatment and thus it also protects the material against the effect of air.

Further stabilization may also be achieved by subjecting the spherical agglomerates obtained to a thermal treatment at temperatures of from 15° to 150° C. in a gas atmosphere, the oxygen content of which is from 0.1 to 21% by volume. This treatment may be carried out very advantageously in a fluidized bed, owing to the abrasion resistance of the agglomerates.

The process for the production of the agglomerates according to the invention may be carried out in apparatus which is known in industry as tumbling mixers. Double cone mixers may also be used. The apparatus must be provided with a heating jacket and it may be operated as a contact drier. Heating may be carried out electrically, or by using steam or a thermal oil. For protection against undesired oxidation during the evaporation process, it is necessary to surround the drier with an inert gas e.g. nitrogen.

As a result of the tumbling movement in the apparatus mentioned, a higher bulk density of the agglomerates is obtained which, on one hand, inhibits oxygen diffusion into the material, consequently resulting in improved stabilization, and on the other hand allows transport in smaller containers. A sticking-on effect does not occur despite the higher apparent weight obtained and the magnetic data are in no way negatively influenced. The resulting agglomerates are distinguished by a good dispersibility during tape production.

The spherical agglomerates according to the invention are therefore outstandingly suitable for the production of magnetic recording media.

The invention is illustrated by the following example, without being restricted thereto.

EXAMPLE 20 kg of a fine-particled metallic iron, as may be obtained by reducing acicular iron oxides in a fluidized bed using hydrogen, is introduced into 77 l of water, which already contains 2.5 kg of a partly-condensed 2-ethyl-butyloxy-triethoxy-silane and 60 g of ammonium polyphosphate. This suspension is homogeneously dispersed in a dispersing machine under an inert gas atmosphere (nitrogen) with cooling for approximately 15 minutes, until the grain size of the solid particles is less than 100 $\mu$m.

50 kg of this suspension, which contains about 20% by weight of solids and may still be effectively pumped, is now passed into a tumbling mixer of approximately 80 l capacity which is steam heated. The suspension is evaporated while the drier rotates, at a jacket temperature of approximately 100° C. and an internal pressure of approximately 50 mbar. After approximately 4 hours, about 80% by weight of the water has evaporated. Thereupon, the second half of the finely-dispersed suspension is added. The complete evaporation, which is carried out under a flow of nitrogen, is completed after a further 10 hours.

The drier is emptied, under a further supply of inert gas, after cooling for 1 hour using cooling water which is passed through the drying jacket instead of steam. Approximately 21.5 kg of spherical agglomerated material is obtained, 90% by weight of which has a grain size of from 1 to 6 mm. The remaining 10% by weight of coarse and fine grains are returned to the process before the wet treatment.

These granulates are habituated to air at room temperature with a slowly increasing oxygen content of the atmosphere during 6 hours and are then annealed with an increase in temperature under a mixture of 50% by volume of air and 50% by volume of nitrogen until a wall temperature of 75° C. is achieved. As a result of this subsequent annealing, the self-ignition temperature, measured in an apparatus known as a "Grewer oven" is again increased by 20° C. (Literature on the Grewer oven: publication of the Trade Association of the chemical industry on Achema 79 "Mehr Sicherheit durch Prüfen" P.37).

The bulk density of the agglomerates was 0.95 kg/l.

During the rubbing on, which usually takes place in solvents, for the production of magnetogram carriers, the spherical agglomerates disintegrate into their primary particles even under the effect of light shearing forces. The particles had a BET surface of 20 m²/g.

The ground agglomerate has the following magnetic values in a magnetic field of 280 KA/m.

| Coercive force | 92 [KA/m] |
|---|---|
| ratio of remanence/saturation magnetization | 0.60 |
| saturation magnetization | $155 \left[ \frac{nTm^3}{g} \right]$ |

It will be appreciated that the instant specification and examples are set forth by way of illustration and not limitation, and that various modifications and changes may be made without departing from the spirit and scope of the present invention.

We claim:

1. A process for the production of spherical non-pyrophoric agglomerates consisting essentially of iron comprising (a) reducing in dry phase particles consisting essentially of iron oxide to form pyrophoric particles consisting essentially of iron,
(b) intensively dispersing the iron particles in liquid phase containing volatile components,
(c) coating the iron particles with an inorganic or organic coating,
(d) separating the iron particles from the liquid phase by evaporating the volatile components while continuously rotating and simultaneously tumbling the particles to an extent such that there are produced agglomerates of about 0.5 to 10 mm in diameter having a BET surface of about 5 to 50 $m^2/g$ and a bulk density from about 0.8 to 1.5 kg/l, and
(e) subjecting the resulting agglomerates to a thermal treatment at from 15° to 150° C. in a gas atmosphere containing from 0.1 to 21% oxygen by volume.

2. A process according to claim 1, wherein between steps (c) and (d) the liquid of the liquid phase containing the particles is subjected to filtration.

3. A process according to claim 1, wherein evaporation is effected under reduced pressure.

4. A process according to claim 1, wherein between steps (c) and (e) the liquid of the liquid phase containing the particles is subjected to filtration and the evaporation is effected under reduced pressure.

* * * * *